(No Model.) 2 Sheets—Sheet 1.

M. W. WHITNEY.
METHOD OF AND APPARATUS FOR FORMING BOTTOMS OF RUBBER SHOES.

No. 337,467. Patented Mar. 9, 1886.

WITNESSES:
C. H. Leuther Jr
Jno. L. Coudron

INVENTOR:
Moses W. Whitney
by Joseph A. Miller & Co
Attys (No Model.)　　　　　M. W. WHITNEY.　　　2 Sheets—Sheet 2.

METHOD OF AND APPARATUS FOR FORMING BOTTOMS OF RUBBER SHOES.

No. 337,467.　　　　　　　Patented Mar. 9, 1886.

WITNESSES:
C. H. Leuther Jr
Jno. L. Condon

INVENTOR:
Moses W. Whitney
by Joseph A. Miller & Co.
Attys

UNITED STATES PATENT OFFICE.

MOSES W. WHITNEY, OF BRISTOL, RHODE ISLAND.

METHOD OF AND APPARATUS FOR FORMING BOTTOMS OF RUBBER SHOES.

SPECIFICATION forming part of Letters Patent No. 337,467, dated March 9, 1886.

Application filed November 11, 1884. Serial No. 147,687. (No model.)

*To all whom it may concern:*

Be it known that I, MOSES W. WHITNEY, of Bristol, in the county of Bristol and State of Rhode Island, have invented a new and useful Improvement in Rubber Bottoms for Boots and Shoes, of which the following is a full, clear, and exact description, reference being had to the accompanying drawings, forming a part of this specification.

Previous to my invention the heels and soles of rubber boots and shoes were formed by distinct and different processes, and were united to the bottom or smooth sole of the boot or shoe by a further process. The heels were first formed in molds, then partially vulcanized, and finally united to the shoe by a final vulcanization, which united a marginal flap, formed upon the heel during the molding process, to the upper, so as to firmly join the heel to the shoe or boot. Thus it will be seen that as heretofore conducted the manufacture of this class of articles was tedious, complicated, and expensive, involving a large amount of hand labor, a great expenditure of time, and the waste of much material, besides not producing uniform results.

The object of my invention is to simplify and cheapen the manufacture of rubber boots and shoes by dispensing with certain of the separate operations heretofore employed, and by substituting in lieu thereof a single step which shall produce the combined results of the former steps.

To the above purposes my invention consists in forming the smooth sole, the outer or tap sole, and the heel simultaneously out of a single piece of rubber.

In order that my invention may be fully understood, I will proceed to describe it with reference to the accompanying drawings, in which—

Figure 1:
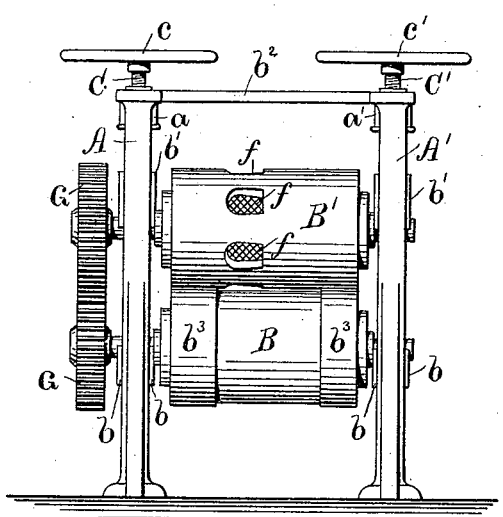
Figure 2:
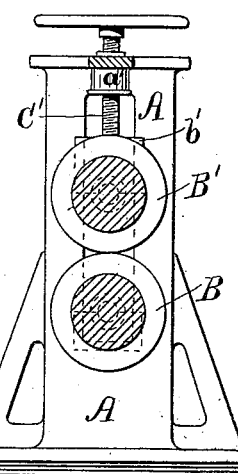
Figure 3:
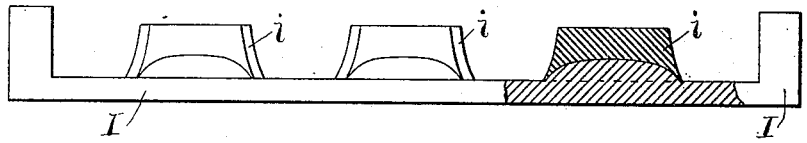
Figure 4:
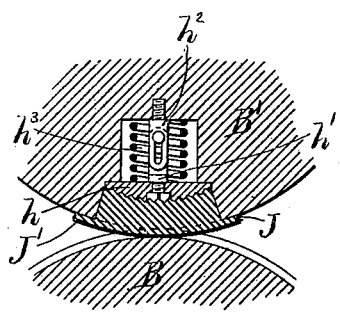
Figure 5:
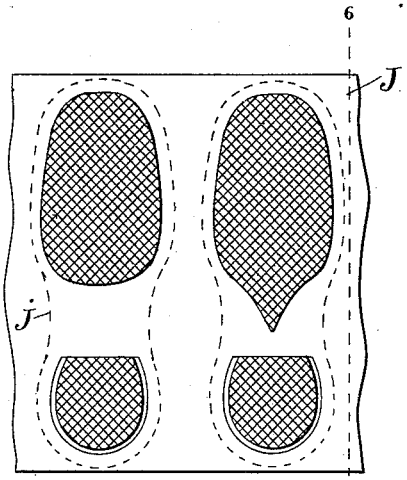
Figure 6:
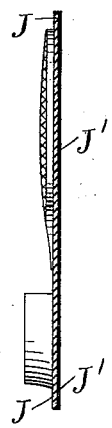
Figure 7:
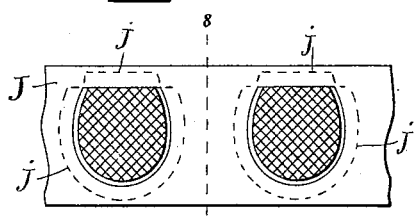
Figure 8:
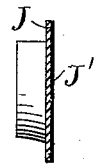
Figure 9:
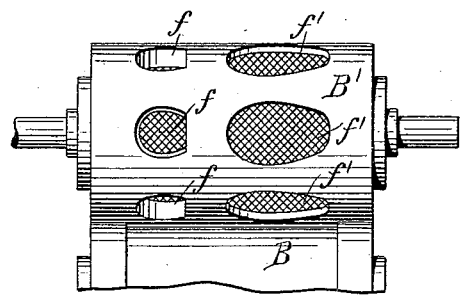
Figure 10:
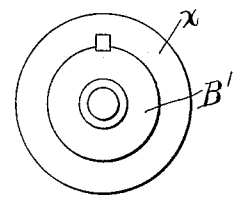

Figure 1 is a front elevation of apparatus for forming the heels. Fig. 2 is a vertical section of the same. Fig. 3 is a side view, partly in section, of the heel-forming rack. Fig. 4 is a sectional view of the contiguous segments of the two rolls, with an improved attachment applied to the upper roll. Fig. 5 is a plan view of a rubber sheet with the soles and heels formed thereon. Fig. 6 is a sectional view of the same on the line 6 6 of Fig. 5. Fig. 7 is a plan view of a sheet with the heels alone formed thereon. Fig. 8 is a sectional view of the same on the line 8 8 of Fig. 7. Fig. 9 is a front elevation of the roll for forming the heels and soles simultaneously. Fig. 10 is an end elevation of the upper or calendering roll.

According to my new method I take a mass of unvulcanized rubber and run it through a pair of rolls, one of which is plain, while the other has formed upon its surface a series of depressions corresponding in form to the shape of rubber heels or soles, or both. The result of this operation is that the rubber is drawn out into a sheet, upon one side of which are embossed the heels or soles, or both. The rolls are set far enough apart to form the sheet by their plane surfaces, and after the rolling the sheet is cut around the heels or soles, or both, so as to separate them from the sheet and form a marginal flap or extension upon their edges, after which the heels or soles, or both, are laid upon a rack having raised forms corresponding to the form of the heel or sole, or both, upon which the rubber settles down into the proper shape. The heels or soles, or both, are then applied to the uppers by cementing the flaps to the latter and then permanently united thereto by vulcanization.

The sheet, with its marginal flaps or extensions, constitutes the smooth sole of the boot or shoe, and the heels or soles, or both, are formed integrally thereon. A strip or sheet of cloth is preferably fed between the rolls with the rubber, so as to lie between the under roll and the mass of rubber, whereby the cloth forms a backing for the rubber and prevents it from stretching during the action of the rolls. As the rubber becomes embedded in the meshes of the cloth the latter adheres permanently to the former and becomes the lining of the sole.

In Figs. 1, 2, and 9 I have illustrated the arrangement for rolling the rubber and embossing it with the heels and soles, Fig. 1 showing the arrangement for forming the heels alone, and Fig. 9 that for forming both the heels and soles simultaneously. In the said figures A A' designate two parallel upright frames, and B B' two rolls having bearings in said frames. The roll B turns in fixed bearings *b* in the frames A A', while the roll B' turns in movable or adjustable bearings $b'$, also in said frames.

The adjustment of the movable bearings is accomplished by means of adjusting-screws C C', which extend downward into the frames A A', and work through threaded sockets $a\ a'$ upon said frames. The movable bearings $b'$ are permanently secured to the lower ends of these screws, and they are turned by means of hand-wheels $c\ c'$ at their upper ends. The spindle of the roll B extends considerably outward beyond its bearing at one end, and carries a gear, G, while the corresponding spindle of the roll B' extends similarly beyond its bearing and carries a gear, G', which meshes into the gear G. A similar arrangement of gears may be arranged upon the opposite ends of the rolls, also, if desired, the arrangement being such that power applied to one roll shall be transmitted by its gear or gears to the other roll. The two frames are securely bolted to the floor, and are braced and connected together by the tie-piece $b^2$.

As shown in Fig. 1, the surface of the roll B' is formed with a series of depressions or cavities, $f$, of such depth and shape as to form each the mold for a rubber heel. The bottom of each of these depressions or cavities may be provided with indented lines to form the friction-surfaces of the heels.

In Fig. 9 the roll B' is shown as being formed with a series of depressions or cavities, $f'$, (in addition to the cavities $f$,) which are of such depth and shape as to mold the soles, and which may also have indented lines on their bottoms to form the friction-surfaces of the soles.

I have shown the roll B' as formed with a series of heel-molds alone, and also with a series of sole and heel molds; but it is evident that the roll may have the sole-molds alone, or that there may be separate molds of both kinds upon the roll. These molds may be of any desired number and form, and may be disposed in various ways upon the surface of the roll.

In order to provide for the formation of heels or soles, or both, of different sizes, I prefer to employ the construction shown in Fig. 10, in which the molds are formed in the outer surface of a hollow cylinder, $x$, which is open at both ends, so as to be slipped upon the roll B', and which is keyed thereon. Thus when a certain size of stock is to be formed the cylinder of that size is placed upon the roll, and when a different size is to be made this cylinder is removed and another having molds of the required size is substituted therefor. However, the molds may be formed directly in the body of the roll, if preferred.

In Fig. 4 I have illustrated an attachment for automatically discharging the molded heels or soles, or both, from the molds. This attachment consists of a block, $h$, which works in the mold, and is held therein by a toggle-link, $h'\ h^2$, the member $h'$ being secured at one end to the block and the member $h^2$ being secured to the roll. This link is surrounded by a stout spring, $h^3$, which acts expansively upon the block. The sides of the mold are flared and the sides of the block are similarly formed. When the sheet of rubber is fed between the rolls, it will press the block inward, and as the mold is carried around past the lower roll the spring will force the block outward, and with it the molded heel or sole, or both. The lower roll is preferably formed or provided with end flanges, $b^3\ b^3$, which serve to confine the rubber in its passage between the rolls, so as to preserve its sheet form.

In Fig. 3 I designates a rack, upon the upper side of which is formed or secured any suitable number of projections or formers, $i$, which are of the shape of a rubber heel or sole. This rack and its projections are of metal or wood, or of any other material suitable to the purpose for which said rack is intended, as hereinafter described.

The manner of using this apparatus is as follows: A mass of unvulcanized rubber is passed between the rolls, by which it is drawn out into a sheet, J, of proper thickness, a sheet, J', of cloth being preferably fed in beneath the rubber. The cavities of the upper roll form the embossed heels and soles, or either of them, upon the upper side of the sheet. The embossed forms are then cut out of the sheet on the lines $j$, so as to leave a margin. The heels or soles, or both, are then laid upon the projections $i$ of the rack I, and are allowed to remain thereon long enough for the rubber forms to settle down in proper shape. The forms are now applied to the uppers by cementing the margins to the same, after which the boots or shoes are submitted to the vulcanizing process. The heels alone may be thus formed and applied to shoes or boots having the ordinary separate smooth soles, and the tap-soles may also be formed and applied to such boots or shoes.

As before stated, the process is rapid and inexpensive, and produces a cheaper and more durable bottom for boots and shoes than has heretofore been attained.

Having thus described my invention, I claim as new and desire to secure by Letters Patent—

1. A complete rubber bottom for a boot or shoe, said bottom formed entirely in one piece, for the purpose described.

2. A complete rubber bottom for a boot or shoe, said bottom consisting of the sole, heel, and tap-sole, and having a marginal flap, all formed in one piece, for the purpose described.

3. A rubber boot or shoe having the complete bottom, consisting of sole, heel, and tap-sole, and a marginal flap, all of said bottom formed in one piece, substantially as described.

In witness whereof I have hereunto set my hand.

MOSES W. WHITNEY.

Witnesses:
J. A. MILLER, Jr.,
M. F. BLIGH.